United States Patent [19]

Schultz

[11] 4,052,023
[45] Oct. 4, 1977

[54] FILM EDITOR

[76] Inventor: Carl R. Schultz, 2802 Maryland Ave., Baltimore, Md. 21218

[21] Appl. No.: 692,397

[22] Filed: June 3, 1976

[51] Int. Cl.² .................... G03B 1/04; G11B 15/32
[52] U.S. Cl. ..................... 242/180; 242/55; 352/129
[58] Field of Search .......... 242/55, 179, 180, 201–209; 352/129; 40/86 A, 106.1

[56] References Cited

U.S. PATENT DOCUMENTS

| 1,215,066 | 2/1917 | Shipman | 242/179 |
| 2,206,476 | 7/1940 | Damblanc | 352/129 |
| 2,217,183 | 10/1940 | Ross | 242/179 |
| 2,509,791 | 3/1950 | Swanson | 242/207 |
| 2,590,005 | 3/1952 | Glenn | 242/179 |
| 2,965,323 | 12/1960 | Foster | 242/204 |
| 2,988,293 | 6/1961 | Gross | 242/179 |
| 3,084,880 | 4/1963 | Grant et al. | 242/202 |

Primary Examiner—Leonard D. Christian
Attorney, Agent, or Firm—Sughrue, Rothwell, Mion, Zinn and Macpeak

[57] ABSTRACT

A film editor comprising two parallel plates supporting spindle bearings mounting at least some of the drive components between the plates and at least some of the film handling components external to the plates.

13 Claims, 6 Drawing Figures

U.S. Patent  Oct. 4, 1977  4,052,023
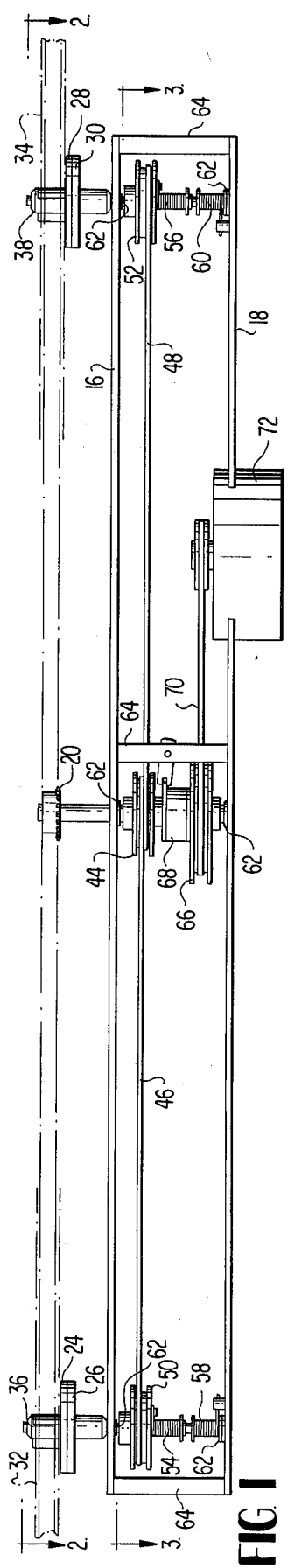
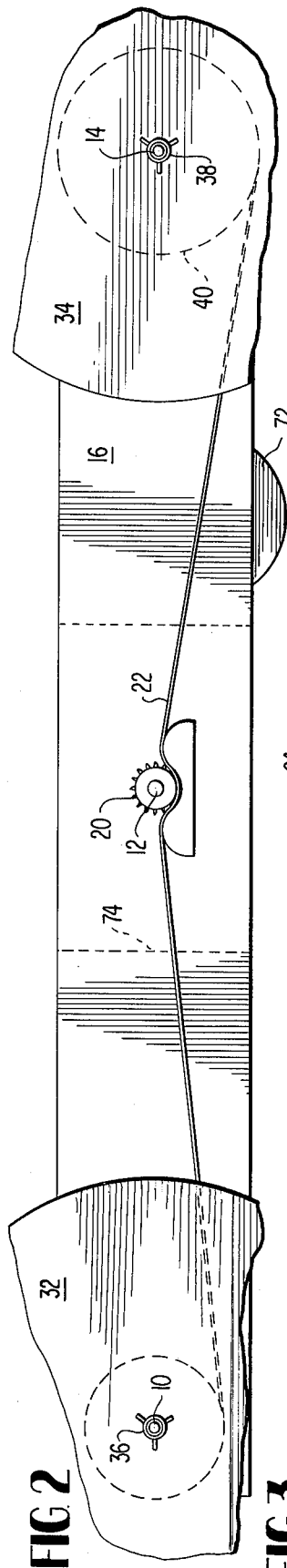
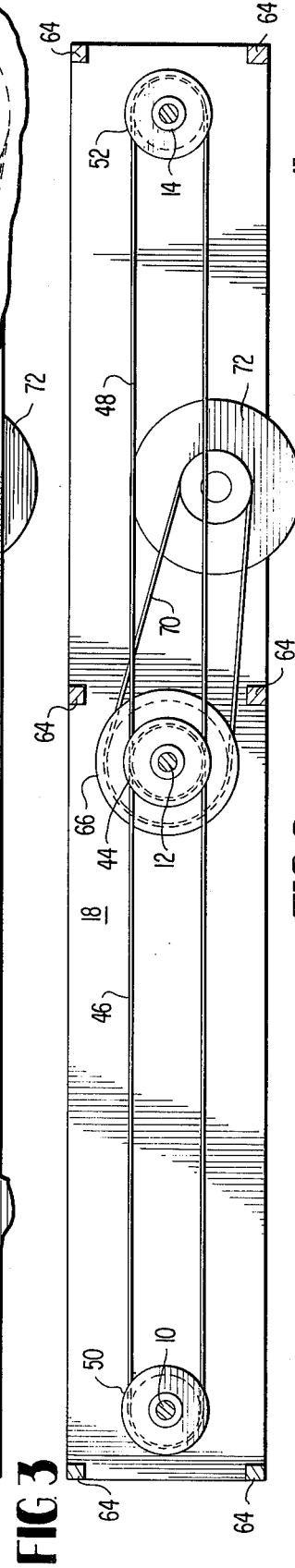
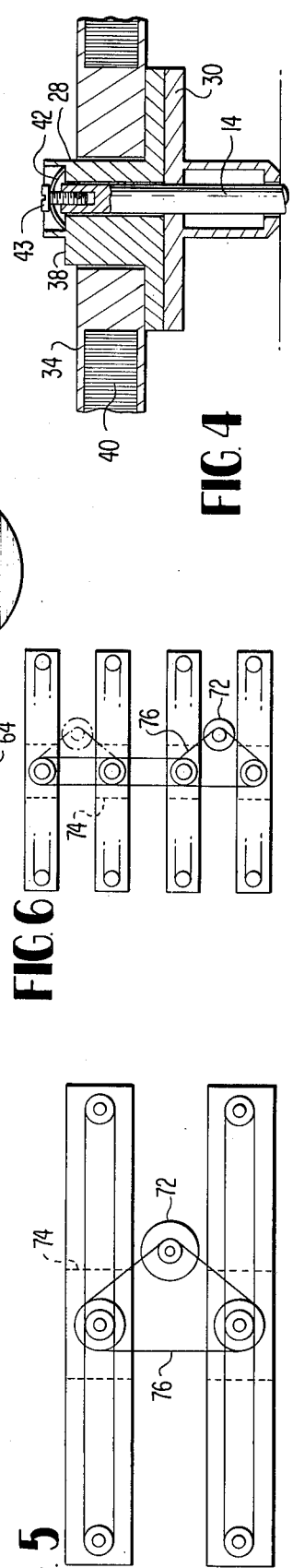

FILM EDITOR

FIELD OF THE INVENTION

This invention relates to film editors such as are used in the post-production phases of motion picture film making.

BACKGROUND OF THE INVENTION

Editing is perhaps the most fundamental of the arts and crafts which comprise the film production process. Editing gives the film maker control of time, which separates film from the other pictorial arts, and control of space and point of view, which separates film from the other theatrical arts. It is thus somewhat ironic that technical developments in the actual machinery of editing have lagged behind technical developments in other phases of motion picture production, particularly photography and sound recording. Vertically arranged editing equipment designed around the time of World War I is still in widespread use today, over 55 years later. The introduction of horizontal editing machines in Europe after World War II has taken more than 20 years to gain a substantial foothold on this side of the Atlantic.

Turning editing equipment "on its side" to achieve a basically horizontal layout would seem to be a trivial modification, more a matter of taste than of real improvement. What it allows, however, is for gravity to take over many of the tasks of keeping film and editing accessories in place that in vertical machines is performed by clips, flanges, and other mechanical contrivances. The horizontal table-top layout is also more convenient for most human operators because they are used to performing many activities at desks and tables. The savings in time realized can be measured in mere seconds or fractions for each operation, but the effect is all-pervasive. The cumulative time savings is substantial, and it occurs entirely in the manual labor area which most distracts from creative decision-making.

Perhaps one of the reasons for the slow acceptance of horizontal editing machines has been the specialized nature and high cost of the equipment. It is to these two factors that this invention addresses itself.

Editing may be the most creative of all the post-production processes, but it is not the only one which is necessary to achieve a finished production. Sound must be transferred and later mixed, picture must be projected, and from time to time even more mundane tasks such as rewinding, cleaning, and measuring film must be performed. In the past, a separate specialized piece of equipment was designed for each duty; a well-equipped was forced to sustain a large investment in equipment. Yet all the pieces of equipment perform tasks more remarkable for their similarities than for their differences; they take film from storage (usually in the form of a roll on a reel or core), move it at a well-controlled speed past a part of the machines (usually called the head) which performs some action upon or with the film, and replace the film into storage again. Conceptually, the only difference between machines is in the design of the heads. For example, a picture head enlarges the image on the film by front or rear projection onto a viewing screen of convenient size, while a sound head translates the magnetic or optical pulses recorded on the film into audible sound.

The rest of the machine might be called a film transport, A well-designed general-purpose film transport, such as is disclosed herein, has uncommitted space available for any of a number of modular special-purpose heads and is capable of performing most post-production tasks. It performs its various tasks without duplicating the film transport parts of the several machines which would otherwise be required to perform the same set of tasks. Since the film transport is in many cases the major cost of constructing a piece of film equipment, the savings can be substantial. There are, of course, the additional benefits which accrue because of the increased familiarity the operator obtains with his equipment by virtue of the major part of the machine being useful for several tasks.

Film production often requires the capability of interlocking two or more strands of film in exact frame-for-frame synchronism while being moved in either direction past one or another type of heads. A rational design for a film transport must thus allow for several such transports to be so arranged so as to achieve this capability with a minimum of additional parts and complication and a maximum of convenience and accessibility for the operator.

Finally, such a film transport must be cheap to manufacture. Quite aside from the considerations of volume which would allow a general-purpose transport to achieve economies of manufacture not possible with highly specialized small-volume machines, a well-designed transport must incorporate features such as simplicity, low parts count, inherent reliability, inexpensively manufactured special parts, and maximum use of aff-the-shelf or generally available components. Such features lead to inexpensive manufacture regardless of production volume.

All of the characteristics mentioned above are or have been available separately in various pieces of film equipment. Thus, a certain amount of modularity or multi-purpose usefulness has been available in expensive machinery; multi-strand capability has been available in expensive or in highly specialized equipment; and very low cost equipment is available only in specialized form mass-produced for the consumer market and totally unsuitable for general-purpose professional service.

The following description details a film transport which, because of its novel design, incorporates all the aforementioned desirable features of modular general-purpose usefulness, simple multi-strand interlock capability, and economy of manufacture. Several possible arrangements of multi-transport configurations are shown which are useful in all phases of the post-production process. The incorporation of this transport design into film post-production equipment will make the benefits of horizontal editing machines available to film producers at greatly reduced cost.

BRIEF DESCRIPTION OF THE DRAWINGS

FIG. 1 is a partially schematic side view of the presently preferred embodiment of the subject invention.

FIG. 2 is a view along the line 2—2 in FIG. 1.

FIG. 3 is a view along the line 3—3 in FIG. 1 with some elements omitted for clarity.

FIG. 4 is an enlarged, sectional view of a detail of FIG. 1.

FIG. 5 is a highly schematic top view of two of the subject film editors operating in tandem.

FIG. 6 is a highly schematic top view of four of the subject film editors operating in tandem.

DETAILED DESCRIPTION OF THE PREFERRED EMBODIMENT

The film transport consists of three spindles 10, 12, and 14 mounted in parallel on plates 16 and 18. The center spindle 12 carries a film sprocket 20 or toothed drive roller which imparts motion to the film strand 22. The sprocket 20 is rigidly fixed to the spindle 12. The two outer spindles 10 and 14 carry pairs of flanges 24, 26 and 28, 30 arranged to support reels or turntables 32, 34 on which the film 22 is supported. The upper flanges 24, 28 are arranged to turn freely on the spindles 10 and 14 and carry keyed members 36, 38 which impart rotary motion to the reels 32, 34, thus maintaining tightly wound rolls of film 40 at all times. The upper flanges 24, 28 are supported in their turn by the lower flanges 26, 30, which are rigidly attached to the spindles 10, 14. Friction between the two pairs of flanges 24, 26 and 28, 30 transmits rotary motion at a variable rate (depending on the weight of the film wound on the reel at any given moment) from the spindles 10, 14 to the upper flanges 24, 28, thus compensating for differences in the outer diameter of the film roll. The friction is regulated by the pressure of curved spring washers 42 (shown only in FIG. 4), which are biased to supplement the weight of the film by screws 43; increasing size (and therefore weight) of the film roll increases the pressure between the flanges and therefore the friction, assuring a snug wind for any size roll of film. The pressure provided by the spring washers 42 is, of course, a function of the degree of compression imparted to it by the screws 43, and the pressure can be regulated by turning the screws in or out. In order to maintain the appropriate pressure once obtained, the screws 43 are preferably lock screws, such as Nylok screws produced by the Allen Mfg. Co. However, other types of biasing means could obviously be used in place of the spring washers 42.

The central spindle 12 transmits motion to the two outer spindles 10, 14 via a system of pulleys, belts, and one-way clutches. The central spindle 12 carries pulley 44 for this purpose, rigidly attached. Two belts 46, 48 are given motion by the pulley 44, each running to a pulley 50, 52 on one of the outer spindles. These latter pulleys are arranged to turn freely in one direction on their respective spindles and to transmit motion in the other direction via one-way clutches 54, 56. The direction in which the pulleys 50, 52 imparts rotary motion to their spindles is chosen with respect to the film path around the film drive sprocket 20 such that when the film sprocket is moving film toward a particular outer spindle, that outer spindle is caused by the belt, pulley, and one-way clutch to turn so as to wind the advancing film 22 onto its reel or core. When the central spindle 12 is rotated in the opposite direction, the one-way clutch allows the pulley to freewheel on the spindle. Under these conditions, an additional one-way clutch 58, 60 which is attached to the plate 18 as well as the spindle prevents the spindle from turning in the opposite direction. The film 22, which under these conditions is being pulled from its reel or core by the film drive sprocket, is kept under tension by the friction between the rotating upper flange and the now stationary lower flange. Since the mechanism is symmetrical, all the above description applied equally, but in the opposite sense of rotation, to the opposite outer spindle.

Thus, it can be seen that, in a transport laid out as described, a rotary motion imparted to the central spindle 12 in one direction will, via the film drive sprocket 20, propel the film 22 from one outer spindle to the other. The film 22 will be held in tension upon exiting from one spindle by friction between the flanges, with that spindle held stationary by a one-way clutch attached to the frame. The film 22 will be held in tension upon being wound into a roll around the other spindle by the rotation of the center spindle 12, which is transmitted to the second outer spindle via a belt, pulley, and one-way clutch arrangement. A reversal of the direction of rotation imparted to the center spindle 12 reverses the direction of film travel as well as reversing the roles of each outer spindle and each of its two associated one-way clutches. The transport is thus bidirectional as well as symmetrical.

The supporting framework which carries the three spindles consists of the two parallel plates 16 and 18, each mounting three bearings 62 allowing free rotation of the shafts. The plates are held parallel by spacer posts 64. The belts, pulleys, and clutches (in other words, the motion transmission components) are located between the two plates. The flanges and sprocket (in other words, the film handling components) are located above the top plate, through which pass all three shafts. This construction has the advantage of maintaining the parallelism and spacing of the shafts in spite of slight bending of the frame, thus admitting the lightweight construction, and additionally allows for maximum separation of the spindle support bearings in a relatively thin structure, giving maximum support to the spindles while allowing flexibility of design in arranging such transports for convenience of use by a human operator.

The central spindle 12 also carries another pulley 66, which can be made to transmit its motion to the spindle, or not, according to whether an associated electro-magnetic cluth 68 is or is not energized. The pulley 66 is in turn put into rotation by a belt 70, which can be made to connect directly or indirectly with a drive motor 72 and/or with other transports.

The individual transport as described can be used with an associated drive motor to perform various functions according to the head or heads which can be attached to it on either side of the film drive sprocket 20 in the area indicated by the broken line 74. However, its usefulness can be greatly expanded if one transport is connected to one or more similar transports via its drive belt as shown in FIGS. 5 and 6. In these instances, the belts 76 must be of the toothed variety commonly called 'timing belts'. A chain and sprocket drive system may also be employed. In this case, if all sprockets and all pulleys each have equal numbers of teeth, strands of film threaded onto the several transports will move in exact frame-for-frame synchronism. Many operations in film production require the ability to move two or more strands of film in synchronism as just described. In addition, by de-energizing one or more of the electro-magnetic clutches 68, the associated film strands can be made to remain at rest while another strand (or strands) can be moved forward or backward at will, thus altering the synchronization. The new synchronization thus obtained can then be maintained by energizing all the electro-magnetic clutches.

An embodiment of the invention will comprise one or more film transports mechanically connected to each other and to one or more drive motors by synchronous belts or chains, each transport carrying one or more modular heads (such as picture head, sound head, cleaning head, etc.). The motor or motors may contain belted or geared speed reduction or not, according to the application, and may be reversible, multi-speed, synchronous, and/or electrically interlocked with other equipment, all according to the application. The entire arrangement may be contained in a portable case or a tabletop according to the type of usage.

It should be clear from the above description that many variations are possible in the arrangement of several transports, and that various implementations of the design principles of the transport itself are possible. It is therefore to be understood that within the scope of the appended claims the invention may be practiced otherwise than as specifically described.

What is claimed is:

1. A film editor comprising a film transport, said film transport comprising:
   a. two parallel plates;
   b. a central spindle rotatably mounted on said parallel plates and extending outwardly thereof;
   c. a film sprocket fixedly mounted on said central spindle outside said parallel plates;
   d. two outer spindles rotatably mounted on said parallel plates and extending outwardly thereof on the same side as said central spindle;
   e. two pairs of flanges one of which is mounted on each of said outer spindles outside said parallel plates, one of each pair of flanges being arranged to support a reel or turntable on which film may be supported in co-operation with said film sprocket and being freely mounted on its respective spindle and the other of each pair of flanges being rigidly attached to its respective spindle, each of said pairs of flanges being in facing, frictional contact; and
   f. first means for driving said central spindle and said outer spindles so that, when it is desired to have film move towards a particular one of said outer spindles, that outer spindle is caused to turn and the other outer spindle is prevented from turning.

2. A film editor as recited in claim 1 and further comprising biasing means biasing each of said pairs of flanges together.

3. A film editor as recited in claim 2 wherein said biasing means is curved spring washer.

4. A film editor comprising a film transport, said film transport comprising:
   a. two parallel plates;
   b. a central spindle rotatably mounted on said parallel plates and extending outwardly thereof;
   c. a film sprocket fixedly mounted on said central spindle outside said parallel plates;
   d. two outer spindles rotatably mounted on said parallel plates and extending outwardly thereof on the same side as said central spindle;
   e. two pairs of flanges one of which is mounted on each of said outer spindles outside said parallel plates, one of each pair of flanges being arranged to support a reel or turntable on which film may be supported in co-operation with said film sprocket and being freely mounted on its respective spindle and the other of each pair of flanges being rigidly attached to its respective spindle, each of said pairs of flanges being in facing, frictional contact; and
   f. first means for driving said central spindle and said outer spindles so that, when it is desired to have film move towards a particular one of said outer spindles, that outer spindle is caused to turn and the other outer spindle is prevented from turning, said first means comprising:
      i. a first pulley rigidly attached to said central spindle between said plates;
      ii. second and third pulleys one of which is freely mounted on each of said outer spindles between said plates and in position to co-operate with said first pulley;
      iii. two one-way clutches, one of which is mounted on each of said outer spindles and attached to one of said second and third pulleys;
      iv. two further one-way clutches, one of which is mounted on each of said outer spindles and attached to one of said plates; and
      v. second means for rotating one of said spindles.

5. A film editor as recited in claim 4 wherein said second means is directly connected to said central spindle.

6. A film editor as recited in claim 5 wherein said second means comprise:
   a. a pulley mounted on said central spindle between said plate and
   b. a drive motor.

7. A film editor as recited in claim 4 and further comprising an electro-magnetic clutch mounted on said one of said spindles between said plates, said electro-magnetic clutch being adapted to cause the pulley mounted on said one of said spindles to transmit motion to the spindle when said clutch is energized.

8. A film editor as recited in claim 1 wherein said first means also drives the central and outer spindles on at least one further film editor as recited in claim 1.

9. A film editor as recited in claim 1 wherein said spindles are vertical, whereby increasing size and weight of the film roll carried by each pair of flanges increases the friction between said flanges.

10. A film editor as recited in claim 4 and further comprising biasing means biasing each of said pairs of flanges together.

11. A film editor as recited in claim 10 wherein said biasing means is a curved spring washer.

12. A film editor as recited in claim 4 wherein said first means also drives the central and outer spindles on at least one further film editor as recited in claim 10.

13. A film editor as recited in claim 4 wherein said spindles are vertical, whereby increasing size and weight of the film roll carried by each pair of flanges increases the friction between said flanges.

* * * * *